March 1, 1938.　　　H. J. KLEIN　　　2,109,748
HEADLIGHT FOR AUTOMOBILES
Filed Aug. 8, 1936　　　2 Sheets-Sheet 1

Inventor
Henry J. Klein,
By Albert Tompkins
Attorney

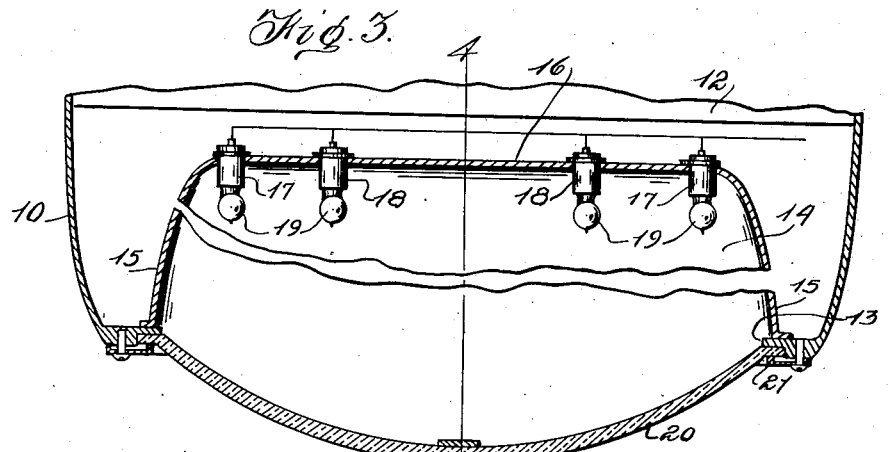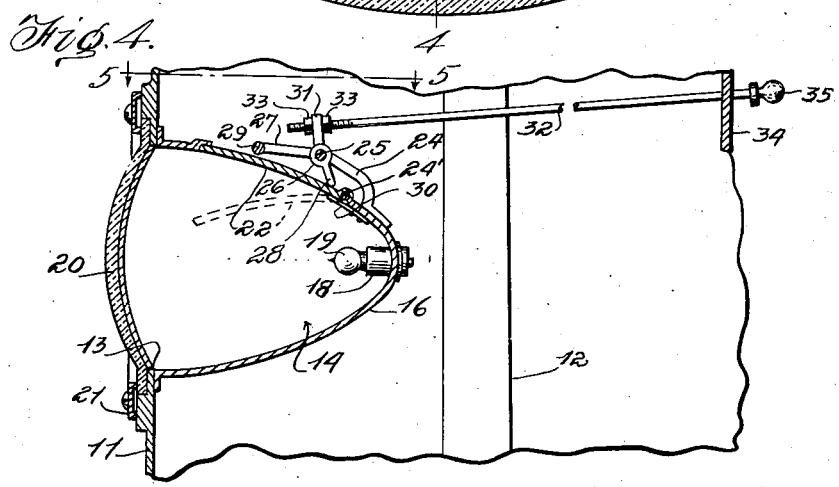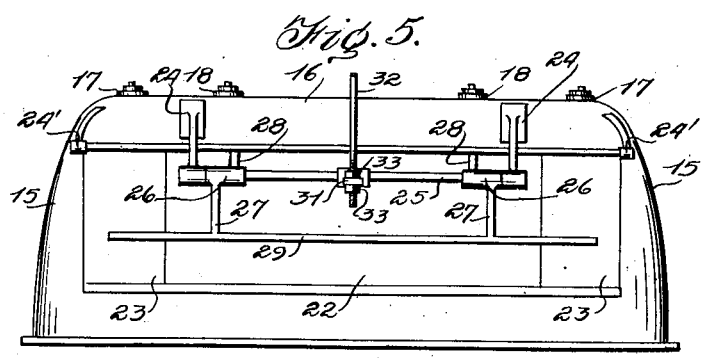

Patented Mar. 1, 1938

2,109,748

UNITED STATES PATENT OFFICE 2,109,748

HEADLIGHT FOR AUTOMOBILES

Henry J. Klein, Washington, D. C.

Application August 8, 1936, Serial No. 95,003

9 Claims. (Cl. 240—8.11)

This invention relates to automobiles and has special reference to headlights for automobiles.

One important object of the invention is to provide an improved form of headlight so combined with the front of the engine hood as to be housed therein, it being understood that by the front of the hood is meant the grille or the radiator, or both grille and radiator.

A second important object of the invention is to provide an improved headlight construction wherein a single reflector is positioned behind both right and left lamps so that it is impossible for the reflector to throw the beam of light from one lamp at a different angle to the horizontal than the beam of light from the other lamp.

A third important object of the invention is to provide a headlight of the above character having a pair of lamps adjacent each end of the reflector.

A fourth important object of the invention is to provide a novel dimming arrangement for such a headlight whereby one lamp at each end of the reflector may be shielded from front observation for driving in certain localities such as city streets, well lit roads and the like.

A fifth important object of the invention is to provide a novel headlight construction whereby the operator may deflect the light from all of the lamps downwardly when desired, as when meeting another automobile, the headlight thus being a so-called "courtesy" light.

A sixth important object of the invention is to provide a novel form of headlight arranged to constitute a laterally spreading flood light especially adapted to not only fully illuminate the highway directly in front of the automobile but also to fully illuminate the sides of the highway so as to avoid the dangers incident to deficient side illumination.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:

Fig. 3 is a fragmentary section on the line 3—3 of Fig. 2.

Fig. 4 is a section on the line 4—4 of Fig. 3.

Fig. 5 is a fragmentary section on the line 5—5 of Fig. 4,

Figure 1:
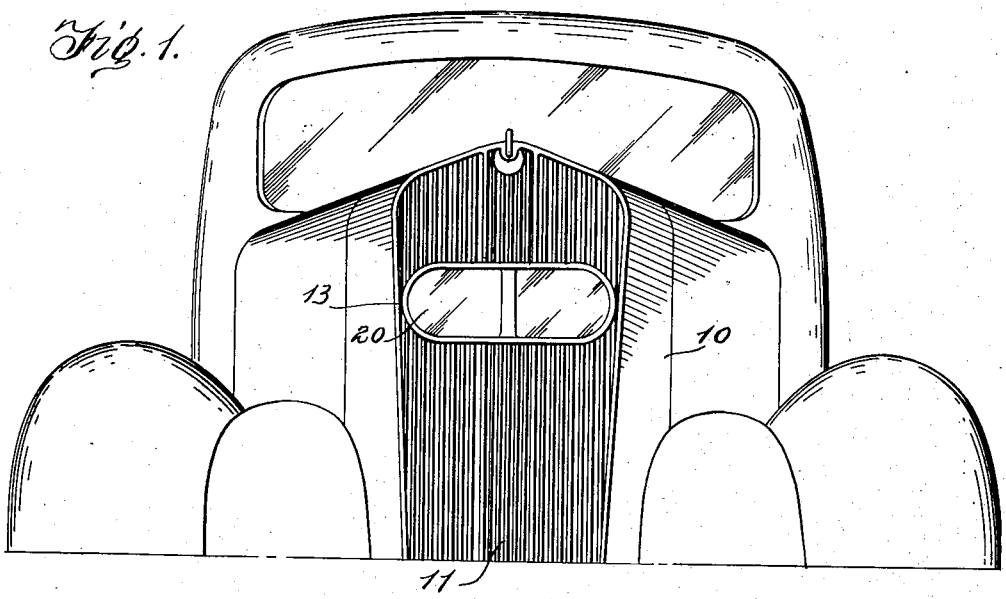
Fig. 1 is an elevation showing a portion of an automobile from the front thereof.
Figure 2:
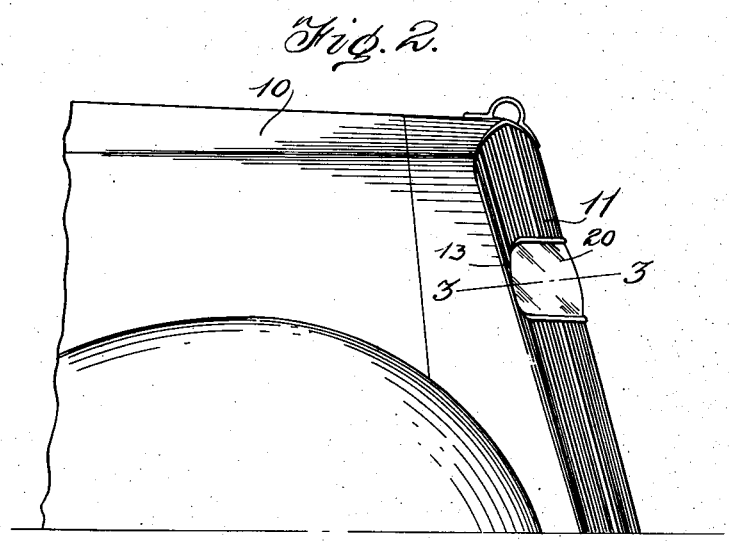
Fig. 2 is a side elevation of a portion of the front part of an automobile.

In the embodiment of the invention as here shown, it has been illustrated as applied to a well known form of automobile having the front of the hood 10 constituted by a peculiarly shaped grille or guard 11 behind which is a radiator 12. While thus shown it will be obvious from what follows that the invention may, by minor changes in size, form and details, be equally well applied to the fronts of other types of automobile hoods whether such fronts are constituted by a grille or the radiator itself.

In the hood front is formed a transversely extending elongated opening 13 behind which is mounted a reflector 14. This reflector is so constructed that its forward end is open and conforms in general outline to the opening 13, being thus elongated transversely of the hood. Each side wall 15 of the reflector is of semi-paraboloidal form and the part 16 between these side walls is parabolic in cross section, as clearly shown in Fig. 4. The focal points of all sections of the part 16 and of the semi-paraboloidal sides lie in the same straight and horizontal line. Mounted in the rear of this reflector is a set of four lamp sockets, there being two sockets 17 axially alined with the axes of the semi-paraboloidal ends and two other sockets 18 having their axes in the horizontal focal plane of the part 16. These sockets are so positioned that electric lamps 19 will have their filaments at the focal line of the reflector.

The opening 13 is closed by a suitable lens 20 which may be secured in any preferred manner as by a ring 21.

The upper wall of the reflector 14 is formed by a central flap portion 22 and lateral flap portions 23 which are hinged to the body of the reflector by a hinge 24'. The flap 22 is of such width that it may span the distance between the lamp sockets 18. Fixed on the upper rear part of the reflector is a pair of spaced brackets 24 wherein is journalled a rock shaft 25 having fixed thereon a pair of sleeves 26 carrying forwardly extending rock arms 27 and a pair of rearwardly extending rock arms 28. The forwardly extending rock arms 27 have a bar 29 fixed to their free ends and this bar lies on the flaps 22 and 23 adjacent their forward ends so that rocking the shaft 25 in one direction will depress the free ends of all three flaps simultaneously. The arms 28 rest normally on the flap 22 adjacent its hinge so that rocking the shaft 25 in the other direction will depress the flap 22 alone. These flaps 22 and 23 are urged to raised positions by springs 30. In order to rock the shaft 25 in desired direction an actuating rock arm 31 is fixed on the shaft 25 and through this rock arm 31 extends an actuating rod 32 secured in the rock arm 31 by adjusting nuts 33. The rod 32 extends through the dash 34 of the automobile and is provided with an operating knob or handle 35.

With this construction it will be seen from Figs. 4 and 5 that whenever it is desired to shield the lamps in the sockets 18 the knob 35 is pulled rearwardly. This rocks the shaft 25 to cause the arms 28 to depress the flap 22 until it covers these lamps. This arrangement may be used for city driving. If one meets another automobile and desires to effect general dimming and depression of the light beam, he grasps the knob 35 and pushes it forwardly, whereupon the bar 29 acts to depress the three flaps 22 and 23 to deflect the light beam downwardly and to cut off some of the direct rays from the lamps to the lens.

There has thus been provided a simple and efficient device of the kind described and for the purpose specified.

What is claimed, is:

1. In combination, an automobile engine hood having a front end provided with an opening, a headlight lens covering said opening, a headlight reflector housed in said hood and having an open front end substantially conforming to said opening, said opening, lens and reflector being laterally elongated to extend substantially from side of said front end, said reflector consisting of a pair of semi-paraboloidal sides and a central portion all vertical sections of which are of parabolic form with the foci of the sides and central portion in a horizontal straight line, a row of lamps in said reflector, and means for shielding some of said lamps and all of said lamps selectively to cut off light rays passing directly from the shielded lamps in an upwardly inclined direction.

2. In combination, an automobile engine hood having a front end provided with an opening, a headlight lens covering said opening, a headlight reflector housed in said hood and having an open front end substantially conforming to said opening, said opening, lens and reflector being laterally elongated to extend substantially from side of said front end, said reflector consisting of a pair of semi-paraboloidal sides and a central portion all vertical sections of which are of parabolic form with the foci of the sides and central portion in a horizontal straight line, a pair of lamps at each side of said reflector, one lamp of each pair having a filament coincident with the focus of one semi-paraboloidal side and the other lamp of said pair having a filament coincident with the focal line in spaced relation to the first lamp, movable means to shield the end lamps, other movable means to shield the intermediate lamps, said shielding means being arranged to move into and out of lamp shielding position, and operative mechanism for moving the shielding means to shield selectively all of said lamps and the end lamps alone.

3. In combination, an automobile engine hood having a front end provided with an opening, a headlight lens covering said opening, a headlight reflector housed in said hood and having an open front end substantially conforming to said opening, said opening, lens and reflector being laterally elongated to extend substantially from side of said front end, said reflector consisting of a pair of semi-paraboloidal sides and a central portion all vertical sections of which are of parabolic form with the foci of the sides and central portion in a horizontal straight line, a pair of lamps at each side of said reflector, one lamp of each pair having a filament coincident with the focus of one semi-paraboloidal side and the other lamp of said pair having a filament coincident with the focal line in spaced relation to the first lamp, a central flap and side flaps forming portions of the upper wall of the reflector, said flaps being hinged at their rear edges to the body of the reflector, and means for selectively depressing the free edge of the central flap independently of the side flaps and for simultaneously depressing the free edges of all of said flaps.

4. In combination, an automobile engine hood having a front end provided with an opening, a headlight lens covering said opening, a headlight reflector housed in said hood and having an open front end substantially conforming to said opening, said opening, lens and reflector being laterally elongated to extend substantially from side of said front end, said reflector consisting of a pair of semi-paraboloidal sides and a central portion all vertical sections of which are of parabolic form with the foci of the sides and central portion in a horizontal straight line, a pair of lamps at each side of said reflector, one lamp of each pair having a filament coincident with the focus of one semi-paraboloidal side and the other lamp of said pair having a filament coincident with the focal line in spaced relation to the first lamp, a central flap and side flaps forming portions of the upper wall of the reflector, said flaps being hinged at their rear edges to the body of the reflector, means for selectively depressing the free edge of the central flap independently of the side flaps and for simultaneously depressing the free edges of all of said flaps, and actuating means operatively connected to the last means and arranged for location adjacent the operator of the automobile.

5. In combination a laterally elongated head light reflector, a laterally elongated lens in front of said reflector, said reflector consisting of a pair of semi-paraboloided sides and a central portion, all vertical sections of which are of parabolic form with the foci of the sides and central portion in a horizontal straight line, a pair of lamps at each side of said reflector, one lamp of each pair having a filament coincident with the focus of one semi-paraboloidal side and the other lamp of said pair having a filament coincident with the focal line in spaced relation to the first lamp, a central flap and side flaps forming portions of the upper wall of the reflector, said flaps being hinged at their rear edges to the body of the reflector, and means for selectively depressing the free edge of the central flap independently of the side flaps and for simultaneously depressing the free edges of all of said flaps.

6. In combination a laterally elongated head light reflector, a laterally elongated lens in front of said reflector, said reflector consisting of a pair of semi-paraboloided sides and a central portion, all vertical sections of which are of parabolic form with the foci of the sides and central portion in a horizontal straight line, a pair of lamps at each side of said reflector, one lamp of each pair having a filament coincident with the focus of one semi-paraboloidal side and the other lamp of said pair having a filament coincident with the focal line in spaced relation to the first lamp, a central flap and side flaps forming portions of the upper wall of the reflector, said flaps being hinged at their rear edges to the body of the reflector, means for selectively depressing the free edge of the central flap independently of the side flaps and for simultaneously depressing the free edges of all of said flaps, and actuating means operatively connected to the last means and arranged for location adjacent the operation of the automobile.

7. In combination, an automobile engine hood having a front end provided with an opening, a headlight lens covering said opening, a headlight reflector housed in said hood and having an open front end substantially conforming to said opening, a row of lamps in said reflector, and means for shielding some of said lamps and all of said lamps selectively, said means including a plurality of flaps, one flap movable to a position for shielding central lamps, and all flaps movable simultaneously to shield all said lamps.

8. In combination, an automobile engine hood having a front end provided with an opening, a headlight lens covering said opening, a headlight reflector housed in said hood and having an open front end substantially conforming to said opening, a plurality of lamps in said reflector, a central shield for selectively shielding intermediate lamps, outer shields for selectively shielding outer lamps and a common controlling means for operating all the shields, said means operating to control the central shield when actuated in one direction and operating on all the shields when actuated in the other direction.

9. In combination, an automobile engine hood having a front end provided with an opening, a headlight lens covering said opening, a headlight reflector housed in said hood and having an open front end substantially conforming to said opening, said opening, lens and reflector being laterally elongated to extend substantially from side of said front end, a plurality of lamps in said reflector, a central shield for selectively shielding intermediate lamps, outer shields for selectively shielding outer lamps and a common controlling means for operating to control the central shield when actuated in one direction and operating on all the shields when actuated in the other direction.

HENRY J. KLEIN.